United States Patent
Koch et al.

(10) Patent No.: US 7,185,663 B2
(45) Date of Patent: Mar. 6, 2007

(54) METHODS AND COMPOSITIONS FOR ON-LINE GAS TURBINE CLEANING

(76) Inventors: Kenneth W. Koch, P.O. Box 841761, Houston, TX (US) 77284; Daniel T. Smith, P.O. Box 841761, Houston, TX (US) 77284; Mark D. Hughes, P.O. Box 841761, Houston, TX (US) 77284; Thomas Urbas, P.O. Box 841761, Houston, TX (US) 77284

( * ) Notice: Subject to any disclaimer, the term of this patent is extended or adjusted under 35 U.S.C. 154(b) by 0 days.

(21) Appl. No.: 10/623,163

(22) Filed: Jul. 18, 2003

(65) Prior Publication Data

US 2004/0016445 A1 Jan. 29, 2004

Related U.S. Application Data

(60) Provisional application No. 60/398,230, filed on Jul. 24, 2002.

(51) Int. Cl.
*B08B 9/00* (2006.01)
(52) U.S. Cl. ................ 134/22.19; 134/6; 134/7; 134/22.1; 134/22.12; 134/23; 134/32; 134/22.18
(58) Field of Classification Search ............ 134/22.18, 134/24, 22.1, 22.12, 23, 32, 22.19, 6, 7
See application file for complete search history.

(56) References Cited

U.S. PATENT DOCUMENTS

| | | | |
|---|---|---|---|
| 2,698,008 A | * | 12/1954 | Hughes ............... 123/1 A |
| 3,934,637 A | * | 1/1976 | Potier ............... 164/56.1 |
| 4,059,123 A | | 11/1977 | Bartos et al. |
| 4,065,322 A | | 12/1977 | Langford |
| 4,163,728 A | * | 8/1979 | Cheng et al. ............... 508/460 |
| 4,196,020 A | | 4/1980 | Hornak et al. |
| 4,713,120 A | | 12/1987 | Hodgens, II et al. |
| 4,808,235 A | | 2/1989 | Woodson et al. |
| 4,834,912 A | | 5/1989 | Hodgens, II et al. |
| 5,002,078 A | | 3/1991 | Kaes |
| 5,011,540 A | | 4/1991 | McDermott |
| 5,273,395 A | | 12/1993 | McDermott |
| 5,279,760 A | | 1/1994 | Sato et al. |
| 6,073,637 A | | 6/2000 | Hayward et al. |
| 6,310,022 B1 | | 10/2001 | Amiran |
| 6,394,108 B1 | | 5/2002 | Butler |

FOREIGN PATENT DOCUMENTS

GB 839762 6/1960

* cited by examiner

*Primary Examiner*—M. Kornakov
(74) *Attorney, Agent, or Firm*—Kenneth A. Roddy

(57) ABSTRACT

Methods and compositions for on-line cleaning of internal surfaces of selected sections of a hydrocarbon fuel burning gas turbine and associated heat recovery equipment, during operation. Cleaning solutions containing graphite and/or molybdenum-based particles and oil soluble corrosion inhibitors, aromatic solvents, and surfactants are selectively introduced directly into the combustion chamber (combustor) of the gas turbine, into the fuel stream, water washing system, or the combustion air system (hot gas path). The cleaning process dislodges unwanted ash deposit buildup and, thereby restores the gas turbine to rated power. When introduced into the compressor section, the particles impinge on the metal surfaces, cleaning them prior to entering the hot gas section where the process may be repeated. They may also be carried through the exhaust to additionally clean attendant heat recovery equipment, if present.

2 Claims, No Drawings

METHODS AND COMPOSITIONS FOR ON-LINE GAS TURBINE CLEANING

CROSS REFERENCE TO RELATED APPLICATION

This application claims priority of U.S. Provisional Application Ser. No. 60/398,230, filed Jul. 24, 2002.

BACKGROUND OF THE INVENTION

1. Field of the Invention

This invention relates generally to gas turbine cleaning methods and compositions, and more particularly to a method for on-line cleaning of the internal surfaces of selected sections of a hydrocarbon fuel burning gas turbine, including the compressor section, hot gas path and, when present, attendant heat recovery equipment, which utilizes cleaning solutions containing graphite and/or molybdenum-based particles, oil soluble corrosion inhibitors, aromatic solvents, and surfactants.

2. Background Art

Gas turbines burning heavy fuels are subject to a rapid buildup of ash deposits on the hot gas path that requires them to be shut down on a regular basis for thorough cleaning by water washing. Some ash is also deposited on downstream boiler tubes used for heat recovery when the gas turbine is operated in a co-generation mode or in combined cycle operation. This effect is still present, although less pronounced, when light distillates, natural gas, and other hydrocarbon based fuels are utilized. These deposits can result in lost power generation for the operator, amounting to potentially hundreds of thousands of dollars per month. Furthermore, deposits formed on the boiler tubes interfere with the normal heat transfer, thereby reducing the quantity of steam produced.

Gas turbine technology has improved to the extent that many gas turbines can now attain nearly 60% thermal efficiencies. These efficiencies are obtainable for nearly all fuels. However, the use of less than clean fuels remains only a minor percentage of fuels for this more important application. Instead, many gas turbines consume large quantities of natural gas and distillate fuels. These clean fuels could be used for other applications if their need was reduced in gas turbine combustion. Many users consider heavy, dirty fuels but regard the increased maintenance and power losses to be more troublesome than it is worth in fuel savings.

Essentially all gas turbines, regardless of the fuel used, suffer power losses due to ingested contaminants in the large volumes of air required to support combustion. With time, these contaminants (e.g., dirt, salt spray, fuel residues, etc.) coat the extremely large surface area of the compressor section. As the deposit accumulates, the compressor efficiency is affected and, in addition, the rotational speed of the turbine may be affected. It becomes necessary to introduce cleaning water and surfactants to wash off the deposits. Many times this cleaning procedure needs to await the shutdown of the gas turbine to do a thorough cleaning. In the meantime, power output is lost from the gas turbine.

The major problem in gas turbine operation on heavy fuels is the presence of sodium and vanadium in the heavy fuel. Both are extremely corrosive at the temperatures attained by modern gas turbines. To limit the effects of sodium, there have been strict limits on the amount of sodium in fuels. To meet the gas turbine manufacturer's requirements, fuel washing is employed. To counteract the corrosive nature of vanadium, magnesium additives are used. Experience has shown that vanadium corrosion is inhibited when the magnesium is added at more than three times the theoretical requirement.

Ash created from the combustion of heavy fuels becomes deposited on the gas turbine hot gas path parts. These deposits hinder the gas flow path streamline flow resulting in reduced power output, decreased efficiency (or increased heat rate), and increased compressor pressure ratio. Periodic cleaning (removal of these ash deposits) is necessary to restore lost power and efficiency, and to enable the compressor to operate within its normal limits. The rate of ash deposition is highly variable, but depends mainly on the turbine duty cycle, firing temperature (and consequently the hot gas path temperatures), and the level of fuel contaminants.

The duty cycle significantly affects the ash deposition rate. Gas turbines in peaking service that are shutdown daily may experience very slow rates of ash deposition. Some of the deposits absorb water (from the atmospheric humidity) during shutdown and spall off during restart due to thermal stresses in the deposits. This effect is reduced as the firing temperature is increased.

The hot gas path temperatures have a significant effect both on the rate of ash deposition and the type of deposit formed. Lower firing turbines will form mainly magnesium sulfate that is a soft material and will readily spall off during subsequent restarts. As firing temperatures increase above the 1700° F. to 1800° F. range, along with the hot gas path temperatures, the predominantly magnesium sulfate deposits are replaced by hard deposits composed mainly of magnesium oxide. These deposits are much harder to remove.

The vanadium fuel concentration and the attendant high level of magnesium inhibitor concentration have a significant influence on the ash deposition rate. As more ash goes through the unit per constant internal surface area, the chances become greater that this ash will build up on the hot gas path parts.

Several methods have been used over the years, the two primary methods being on-line cleaning and off-line cleaning. In on-line cleaning, nutshells (walnut, pecan, and/or rice hulls), coke, and other substances have been introduced into the combustion chamber. Those particles that don't combust collide with the ash deposits causing them to spall off the blades. Unfortunately, many of the nutshells end up as extremely fine carbon ash that lacks the energy to clean the deposits. Also unburned nutshells can end up in bearings and other areas of the gas turbine where they are an unwanted nuisance. As a consequence of the difficulties of controlling the nutshells, this method of cleaning is used only when necessary. However, the main advantage of the nutshell technique is that it can be accomplished while the gas turbine is running (albeit usually at reduced load), generating electricity.

The other main cleaning method is off-line water washing. For this method the turbine must be taken out of service, cooled, and then water is injected through spray nozzles, while the engine is on crank speed, to thoroughly soak the deposits (some deposits may dissolve). There are many drawbacks to this method, the foremost being that the turbine is out of service during the cleaning operation. Water washing is used extensively to return gas turbines to full power. Additionally, the cleaning is often not adequate to completely remove all deposits. When the gas turbine is placed back into service with deposits still remaining, these deposits can become very hard from being subjected to additional periods of high temperature.

There are a number of patents that disclose gas turbine cleaning methods, for cleaning both compressors and the hot gas path. Those for compressor cleaning are much more numerous than those that include the hot gas path. There are also several patents that disclose various chemical compositions used to clean deposits from gas turbine compressors, and others that disclose methods and/or apparatus with or without the use of chemicals.

Batos, et al, U.S. Pat. No. 4,059,123 discloses a chemical cleaning method with a preservative. Likewise, Woodsen, et al, U.S. Pat. No. 4,808,235, and Sato, et al, U.S. Pat. No. 5,279,760 disclose different chemical cleaning solutions. Kaes, U.S. Pat. No. 5,002,078 discloses a chemical cleaning method for compressors that can be implemented off-line or on-line. Similarly, Amiran, U.S. Pat. No. 6,310,022 discloses a chemical cleaning composition to be used (off-line) for compressor cleaning while the compressor is being cranked.

Hodgens II, et al, U.S. Pat. Nos. 4,713,120 and 4,834,912 disclose a spray injection method and chemical compositions, respectively, for rinsing "baked-on" sand deposits from the compressor and turbine of aircraft type engines.

Hornak, et al, U.S. Pat. No. 4,196,020 discloses a wash spray nozzle apparatus for cleaning the compressor and turbine of a unit using a cleaning and rinsing method which also includes a preservative. Similarly, Butler, U.S. Pat. No. 6,394,108 discloses a specially fabricated flexible hose with nozzles on it which is inserted into the first several stages of an off line gas turbine compressor for compressor cleaning. McDermott, U.S. Pat. Nos. 5,011,540 and 5,273,395 disclose an apparatus and method utilizing a chemical solvent for cleaning compressors.

Hayward, et al, U.S. Pat. No. 6,073,637 discloses a water spray method for cleaning gas turbine compressors in which droplets of a cleaning fluid are sprayed into the compressor, comprising the steps of: spraying droplets of a substantially first uniform size into or onto the fluid path for a first period, and then spraying droplets of a substantially second uniform size into or onto the fluid path for a second period.

Two patents disclose methods of cleaning the hot gas path of a gas turbine. Langford, U.S. Pat. No. 4,065,322 discloses the use of coke particles to remove contaminants from the compressor and turbine sections, wherein the addition of the coke particles is through the air stream. British Patent GB839762 (Ross) discloses a method for limiting the deposition of fuel oil ash on the blading and other parts of a gas turbine, wherein particles of carbonaceous material (graphite) are added to the fuel oil prior to combustion in a ratio of from ½% to 3% by weight. The carbonaceous materials can be used with or without a magnesium compound corrosion inhibitor, but the patent is silent as to the amount of magnesium.

The present invention is distinguished over the prior art in general, and these patents in particular by a method for on-line cleaning of the internal surfaces of selected sections of a hydrocarbon fuel burning gas turbine including the compressor section, hot gas path, and attendant heat recovery equipment that may be present when the gas turbine is operated in a co-generation mode or in combined cycle operation, which utilizes cleaning solutions containing graphite and/or molybdenum-based particles and oil soluble corrosion inhibitors, aromatic solvents, and surfactants. The cleaning compositions may be introduced directly into the combustion chamber (combustor) of the gas turbine, into the fuel stream, water washing system, or the combustion air system (hot gas path). The cleaning process dislodges unwanted ash deposit buildup and, thereby restores the gas turbine to rated power. When introduced into the compressor section, the graphite/molybdenum-based particles impinge on the metal surfaces, cleaning them prior to entering the hot gas section where the process may be repeated. If sufficient velocity is present, the particles are then carried through the exhaust wherein they impinge on the boiler tubes, providing an additional cleaning process. The cleaning process and formulations are effective in cleaning any hydrocarbon fuel burning gas turbine including heavy fuels, light distillate fuels, natural gas, and gas turbines that have multi-fuel capability.

SUMMARY OF THE INVENTION

It is therefore an object of the present invention to provide a method for on-line cleaning of the internal surfaces of selected sections of a hydrocarbon fuel burning gas turbine including both the compressor section and hot gas path, which may be carried out during operation of the turbine.

It is another object of this invention to provide a method for on-line cleaning of the internal surfaces of including the compressor section, hot gas path, and attendant downstream heat recovery equipment that may be present when the gas turbine is operated in a co-generation mode or in combined cycle operation, which may be carried out during operation of the turbine.

Another object of this invention to provide a method and cleaning compositions for cleaning the internal surfaces of selected sections of a gas turbine, and attendant downstream heat recovery equipment if present, that will effectively clean any hydrocarbon fuel burning gas turbine operating on heavy fuels, light distillate fuels, natural gas, and gas turbines that have multi-fuel capability.

Another object of this invention is to provide a turbine cleaning composition utilizing graphite and/or molybdenum-based particles ranging in size from about 0.01 to about 50,000 microns, which may be utilized alone or in combination with oil soluble corrosion inhibitors, aromatic solvents, and surfactants for continuous cleaning and protection against vanadium corrosion of the gas turbine, and attendant downstream heat recovery equipment if present.

Another object of this invention is to provide a method for online cleaning of a hydrocarbon fuel burning gas turbine, and attendant downstream heat recovery equipment if present, utilizing cleaning compositions that may be introduced directly into the combustion chamber (combustor) of the gas turbine, into the fuel stream, water washing system, or the combustion air system (hot gas path).

Another object of this invention is to provide a turbine and heat recovery equipment cleaning composition utilizing graphite and/or molybdenum-based particles ranging in size from about 0.01 to about 50,000 microns, which when introduced into the compressor section of the turbine, impinge on the metal surfaces, cleaning them prior to entering the hot gas section and attendant downstream heat recovery equipment, if present.

Another object of this invention is to provide a turbine and heat recovery equipment cleaning composition utilizing expandable graphite particles which when introduced into the turbine will pass through filters and other equipment while in an unexpanded state, and after becoming heated will instantaneously expand in volume to up to 200 times its initial volume, to effectively clean the hot gas path of the turbine and attendant downstream heat recovery equipment, if present.

A further object of this invention is to provide a turbine cleaning and heat recovery equipment composition which is safe and innocuous in the environment and which, if spilled, is easily cleaned by sweeping, followed by soap and water washing.

A still further object of this invention is to provide turbine cleaning compositions for cleaning hydrocarbon fuel burning gas turbines that are inexpensive to produce.

Other objects of the invention will become apparent from time to time throughout the specification and claims as hereinafter related.

The above noted objects and other objects of the invention are accomplished by a method for on-line cleaning of the internal surfaces of selected sections of a hydrocarbon fuel burning gas turbine including the compressor section, hot gas path, and attendant heat recovery equipment that may be present when the gas turbine is operated in a co-generation mode or in combined cycle operation, which utilizes cleaning solutions containing graphite and/or molybdenum-based particles and oil soluble corrosion inhibitors, aromatic solvents, and surfactants. The cleaning compositions may be introduced directly into the combustion chamber (combustor) of the gas turbine, into the fuel stream, water washing system, or the combustion air system (hot gas path). The cleaning process dislodges unwanted ash deposit buildup and, thereby restores the gas turbine to rated power. When introduced into the compressor section, the graphite/molybdenum-based particles impinge on the metal surfaces, cleaning them prior to entering the hot gas section where the process may be repeated. If sufficient velocity is present, the particles are then carried through the exhaust wherein they impinge on the boiler tubes, providing an additional cleaning process. The cleaning process and formulations are effective in cleaning any hydrocarbon fuel burning gas turbine including heavy fuels, light distillate fuels, natural gas, and gas turbines that have multi-fuel capability.

DESCRIPTION OF THE PREFERRED EMBODIMENTS

The present invention provides a method for on-line cleaning of the internal surfaces of selected sections of a hydrocarbon fuel burning gas turbine, including both the compressor section and hot gas path, and also attendant downstream heat recovery equipment if present, which utilizes cleaning solutions containing graphite and/or molybdenum-based particles and oil soluble corrosion inhibitors. As described in detail hereinafter, the cleaning compositions may be introduced directly into the combustion chamber (combustor) of the gas turbine, into the fuel stream, water washing system, or the combustion air system (hot gas path). The cleaning process dislodges unwanted ash deposit buildup and, thereby restores the gas turbine to rated power. When introduced into the compressor section, the graphite/molybdenum-based particles impinge on the metal surfaces, cleaning them prior to entering the hot gas section where the process may be repeated. When the gas turbine is operated in a co-generation mode or in combined cycle operation, and if sufficient velocity is present, the particles are then carried through the exhaust wherein they impinge on the boiler tubes, providing an additional cleaning process. The cleaning process and formulations are effective in cleaning any hydrocarbon fuel burning gas turbine operating on heavy fuels, light distillate fuels, natural gas, and gas turbines that have multi-fuel capability, and attendant downstream heat recovery equipment if present.

The graphite and/or molybdenum-based particles utilized in the present cleaning solution range in size from about 0.01 to about 50,000 microns, depending upon the particular application. The graphite material may be selected from the group consisting of natural graphite, synthetic graphite, expandable graphite, non-expandable graphite or mixtures thereof.

The oil soluble corrosion inhibitors utilized in the present cleaning solution may include magnesium carboxylates, magnesium, cerium, zirconium, nickel, silicon, chromium, aluminum, barium, manganese, and iron. A suitable commercially available magnesium-based carboxylate corrosion inhibitor, sold under the trademark LMG-30E®, is produced by Liquid Minerals Group, Inc., of Houston, Tex. The LMG-30E® magnesium-based carboxylate corrosion inhibitor has a high concentration (30%) of useful magnesium.

In some applications the cleaning solution may include a commercially available aromatic solvent, and in some applications, both an aromatic solvent and a surfactant may be used. Suitable surfactants include, but are not limited to, fatty acids, sulfonic acids, organic carboxylic acids, and polymeric materials.

Depending upon the particular application, the graphite and/or molybdenum-based particles ranging in size from about 0.01 to about 50,000 microns may be utilized alone or in combination with the oil soluble corrosion inhibitors, solvents, and surfactants. Depending on the degree of deposit buildup and bonding, a larger or smaller size particle may be selected for the most efficient cleaning required. When the graphite and/or molybdenum-based particles are used in combination with a magnesium-based oil soluble corrosion inhibitor additive for continuous cleaning and protection against vanadium corrosion of the gas turbine, and downstream heat recovery equipment if present, the following formulations are suggested.

EXAMPLE 1

Graphite—Molybdenum-based Cleaning Composition

| | |
|---|---|
| Oil soluble corrosion inhibitor | 97.0 wt %; and |
| Graphite and/or Molybdenum-based particles (0.01 to 50,000 microns in size). | 3.0 wt %. |

EXAMPLE 2

Graphite—Molybdenum-based Cleaning Composition

| | |
|---|---|
| Oil soluble corrosion inhibitor | 99.0 wt %; and |
| Graphite and/or Molybdenum-based particles (0.01 to 50,000 microns in size) | 1.0 wt %. |

EXAMPLE 3

Graphite—Molybdenum-based Cleaning Composition

| | |
|---|---|
| Oil soluble corrosion inhibitor | 83.3 wt %; |
| Aromatic solvent | 15.7 wt %; and |
| Graphite and/or Molybdenum-based particles (0.01 to 50,000 microns in size) | 1.0 wt %. |

EXAMPLE 4

Graphite—Molybdenum-based Cleaning Composition

| | |
|---|---|
| Oil soluble corrosion inhibitor | 83.3 wt %; |
| Aromatic solvent | 13.2 wt %; |
| Surfactant | 2.5 wt %; and |
| Graphite and/or Molybdenum-based particles (0.01 to 50,000 microns in size) | 1.0 wt %. |

In Examples 1–4, above, the graphite material is selected from the group consisting of natural graphite, synthetic graphite, expandable graphite, non-expandable graphite or mixtures thereof.

The oil soluble corrosion inhibitors utilized in Examples 1–4 above include magnesium carboxylates, a magnesium-based carboxylate corrosion inhibitor sold under the trademark LMG-30E®, magnesium, cerium, zirconium, nickel, silicon, chromium, aluminum, barium, manganese, and iron. The preferred magnesium-based carboxylate corrosion inhibitor is sold under the trademark LMG-30E®, produced by Liquid Minerals Group, Inc., of Houston, Tex., which has a minimum magnesium concentration of 30%.

Cleaning Methods

There are numerous types and configurations of gas turbines, depending on the manufacturer. Most gas turbine manufacturers would limit the allowable power loss to the range of 5–10% per 100 hours of operation. Losses higher than this may cause other operating problems such as compressor surge. To remove these deposits and regain a portion of this power loss, the following preferred on-line cleaning methods are employed.

The present cleaning compositions and methods allow a gas turbine operator to periodically clean hydrocarbon fuel burning gas turbine compressor and/or hot gas paths while still online. The cleaning compositions are held in a hopper or similar device and fed to the desired turbine section to be cleaned. Then from time to time—as determined by field trials—a quantity of the cleaning composition is fed to the gas turbine to effect the removal of deposits. The frequency and amount of cleaning composition fed to the turbine is such that the power loss associated with deposit build-up is maintained at a manageable rate. Because this method can be done intermittently while the gas turbine is in operation, there is no lost time due to turbine cool-down periods (to prevent thermal shock). This allows more opportunity to generate electricity due to less down time.

The graphite and/or molybdenum-based particles alone or in combination with the oil soluble corrosion inhibitors, solvents, and surfactants may be added directly into the combustion chamber from the hopper or similar device, utilizing conventional water wash nozzles. Conventional water wash nozzles were developed during the 1970's to allow for the easy addition of water while the turbine was off-line to water wash the hot gas section of the gas turbine. These nozzles are designed to be used only when the turbine is off-line, thus, their use to introduce the cleaning compositions would not interfere with their primary function since the two operations would be mutually exclusive—cleaning compositions while the turbine is operating, water when it is shut down.

A second option, is to "blow" the cleaning compositions into the inlet air after the air filter to clean not only the compressor, but the particles would then continue into the hot gas section of the gas turbine, continuing the cleaning operations there. Because this method can be used more or less continuously, concerns of introducing sodium from the compressor into the hot gas section are minimized, as the overall concentration of this contaminant should not be excessive on a real time basis.

In addition, it is also possible to introduce the cleaning compositions into the compressor section of a gas turbine for the express purpose of cleaning the compressor. Compressor section cleaning—like hot gas section cleaning—is conventionally done while the gas turbine is off-line. However with the present methods and compositions, continuous or semi-continuous addition of the cleaning compositions will remove deposits in real time. If the cleaning is done often enough, any deposits that are removed should be small enough in quantity to not jeopardize the integrity of the hot gas section on the gas turbine. Thus the present method is ideal for gas fired or clean distillate fuel gas turbines that are not expected to come off-line very often, and allows them to operate more or less continuously as desired.

There may be situations when the particles ingested into the compressor for the sole purpose of compressor cleaning are not adequately "airborne", i.e., they do not have enough velocity to carry them into the compressor where they can contact the metal surfaces. In these situations, an equipment skid setup may be provided consisting of: (1) a hopper that can be pressurized by air, (2) an air compressor or other suitable means of supplying pressurized air, (3) several pressure gauges, (4) one inch piping equipped with valves to "meter in" the cleaning composition into the air inlet of the gas turbine after the inlet filter, and (5) attendant controls.

Another mode of employing the cleaning compositions is to introduce them directly to the combustion section by injecting them into the combustion air. This requires the fitting out of at least one combustion air pipe to allow the addition of the cleaning compositions. Although it may require some reconfiguration of the gas turbine, this is a viable method of introducing the graphite materials since it is very near the hot gas section where the majority of deposits are found.

For any specific gas turbine unit, a single charge of 200 lbs. (90 kg.) would be used for a single cleaning operation. The specific particle size range of graphite and molybdenum-based particles are selected based on field trials. This single charge is evenly divided into several (or possibly numerous) equal charges, as determined by the number of combustors, as applicable for the unit to be cleaned. Some units may have two large combustors while others may have 10 to 12 or more combustors, highly dependent on the specific manufacturer and the design version of the unit. Thus, the charge or charges may be held in one or more independent hoppers.

A combustor specific charge is propelled into the specific combustor selected through the water wash nozzles (already in place) by the use of pressurized air (atomizing air or other high pressure supply). The charge should be evenly distributed over a period of approximately 20 to 30 minutes, by use of a ball valve on the exit line of the hopper. This even flow is required to prevent combustor flameout. During this period, note should be taken of the actual power output and turbine exhaust temperature. When no further increase in the power output or decrease in the turbine exhaust temperature is noted, the cleaning sequence is complete.

This procedure, which is then repeated sequentially for all combustors, may remove on the average of 50% of the ash deposits, resulting in a substantial regain of the power lost.

However, the actual removal will usually be in the 25% to 75% range, but in some instances may be as low as 10%. Higher firing temperature gas turbines will have ash deposits that are harder to remove than units that fire at lower temperatures. A second or third charge per each combustor may be necessary. This complete cleaning sequence can be adjusted based on actual field experience at any installation. It can also be repeated as deemed necessary based on operating modes.

Lastly, another mode of employing the cleaning compositions is to introduce them directly into the fuel system of the turbine. The recommended minimum treating ratio is 3 parts of magnesium to 1 part of vanadium in the fuel. The actual stoichiometric amount of magnesium required to just react with vanadium to make compounds, which are innocuous (non-corrosive) is only about 0.7:1. However, additional magnesium is added because not only is the desired magnesium orthovanadate formed, but also other less desirable magnesium vanadium compounds and other magnesium products (magnesium oxide and magnesium sulfate). The additional magnesium forces the reaction to form the orthovanadate and offsets some of the other less desirable magnesium vanadium products. Additionally, since the time allowed for the reaction is very short (high gas velocity in the region of the flame), the greater the amount of magnesium added, the greater are the opportunity for a vanadium atom to find (react with) a magnesium atom.

Using a preferred magnesium carboxylate corrosion inhibitor additive containing a minimum of 30% magnesium, the formulation would contain about 1% graphite and/or molybdenum-based materials used for cleaning. With these formulations, sufficient graphite or other material would be available to maintain the gas turbine in a clean condition longer when treating residual or furnace oil fuels.

When treating Light Arabian crude fuels, it may be necessary to include a supplemental treatment of graphite and/or molybdenum-based materials and the other constituents in the formulations as set forth in the Examples above. The reason for this is that these fuels normally contain lesser quantities of vanadium, and consequently require less magnesium carboxylate type corrosion inhibitor additive for treatment. In some instances, not enough graphite and/or molybdenum-based materials can be added with normal treatment. Thus a supplemental treatment is needed to provide the desired amount of graphite and/or molybdenum-based materials and ensure the gas turbine is maintained in a cleaner state. The power loss of the gas turbine should be monitored as is usually done.

When introduced into the compressor section, the graphite/molybdenum-based particles impinge on the metal surfaces, cleaning them prior to entering the hot gas section where the process may be repeated.

The standard CRC Handbook states that graphite has a melting point of 3652° C., and thus will not melt at typical gas turbine temperatures. This ensures the particles remain to perform the work of removing ash deposits, as is not the case with many types of nutshells that have been used in prior art cleaning methods. In addition, graphite has a specific gravity of 2.2 to 2.6, much greater than that of nutshells whose specific gravity is in the ~1.3 to 1.4 range. Since momentum is equal to mass times velocity, the specific gravity of the particles enhances the cleaning process.

The graphite and some molybdenum-based particle materials are also malleable. This allows them to conform to the metal contours of the turbine surfaces thereby reducing air resistance and drag due to any particles that might ultimately adhere to a metal surface.

Another valuable property of the graphite and some molybdenum-based particle materials is their lubricating ability. Any particles that impacted the blades or buckets would leave behind only a slippery surface; this feature aids in further impeding the deposition of ash and other undesirable deposits.

Furthermore, new forms of graphite have been developed that expand up to 200 times their initial volume when heated. These "expandable graphites" retain many of the desirable properties of graphite even after expansion (lubricity, corrosion protection, heat transfer protection, etc.). Thus, "expandable graphite" particles are particularly suited for inclusion into the various additive formulations of the present invention. For example, the addition of a small amount of one-micron sized graphite particles, into the magnesium carboxylate corrosion inhibitor formulation will allow the graphite to pass filters and other equipment while in its unexpanded state. But once the expandable graphite passed into the flame, it would instantaneously expand in volume to up to 200 microns.

Still another advantage of utilizing graphite is that it is amorphous carbon so it is essentially innocuous in the environment; thus, there are few handling difficulties. Sweeping, followed by soap and water washing, can easily clean up material spills. After the graphite passes through the gas turbine performing its cleaning function, any stray particles can be controlled, as would normal particles using technologies that already exist on the turbine.

While this invention has been described fully and completely with special emphasis upon preferred embodiments, it should be understood that within the scope of the appended claims the invention may be practiced otherwise than as specifically described herein.

The invention claimed is:

1. A method for on-line cleaning of the internal surfaces of selected sections of a hydrocarbon fuel burning gas turbine, during operation, without significant loss of turbine power, comprising the steps of:
   contacting the surfaces to be cleaned with a cleaning composition comprising:
   expandable graphite particles ranging in size from about 0.01 to about 50,000 microns and capable of expanding up to about 200 times their initial volume when heated above a predetermined temperature;
   an oil soluble magnesium carboxylate corrosion inhibitor having a minimum concentration of 30% magnesium; and
   an aromatic solvent.

2. The method according to claim 1, wherein
   said cleaning composition comprises about 1.0 wt % of said expanded graphite particles;
   about 83.3 wt % of said oil soluble magnesium carboxylate corrosion inhibitor; and
   about 15.7 wt % of said aromatic solvent.

* * * * *